United States Patent [19]

Peel

[11] Patent Number: 4,553,162
[45] Date of Patent: Nov. 12, 1985

[54] TELEVISION TRANSMITTER

[75] Inventor: Geoffrey C. Peel, Cambridge, England

[73] Assignee: U.S. Philips Corporation, New York, N.Y.

[21] Appl. No.: 549,117

[22] Filed: Nov. 7, 1983

[30] Foreign Application Priority Data

Dec. 17, 1982 [GB] United Kingdom ............... 8236036

[51] Int. Cl.⁴ ..................... H04W 7/04; H04W 5/38
[52] U.S. Cl. ................................. 358/144; 358/186
[58] Field of Search ............... 358/144, 143, 186; 381/3, 4

Primary Examiner—John C. Martin
Assistant Examiner—Howard L. Carter
Attorney, Agent, or Firm—Thomas A. Briody; William J. Streeter; Edward W. Goodman

[57] ABSTRACT

A television transmitter for transmitting signals including two sound channels either for dual language or stereophonic sound transmission includes a combining filter 4 having a narrow sound passband. In order to reduce the amplitude modulation of the sound signals caused by the filter characteristic on the frequency modulated sound carriers, the sound carrier signals are amplitude modulated in the opposite sense to that produced by the filter characteristics. This is achieved by passing the modulated sound carrier signals through tuned circuits (L1, C1 and L2, C2) which have their resonant frequencies and Q's appropriately chosen.

3 Claims, 7 Drawing Figures

TELEVISION TRANSMITTER

BACKGROUND OF THE INVENTION

The invention relates to a television transmitter comprising a vision signal amplifier, a second signal amplifier, a sound and vision combining filter means for generating two frequency modulated sound carrier signals, and means for feeding the frequency modulated sound carrier signals to the sound signal amplifier.

Various proposals have been made for transmitting stereo sound with television pictures or for providing dual channel sound so that a program can be heard in one of two languages selected by the viewer. Such systems are already in operation in the Federal Republic of Germany and trials have taken place elsewhere.

The two sound carrier signals may typically be separated by 250 KHz and this causes problems with the combining filter. This filter normally comprises a notch filter tuned to the sound carrier frequency so that amplitude modulation, caused by the filter due to frequency modulation of the sound carrier, is kept to a minimum. This is a requirement of the Broadcasting Authorities who lay down specifications for the signals to be transmitted. The passband of the notch filter is insufficient to allow both modulated sound carriers to meet the current specifications. This problem has been overcome by modifying the combining filter to provide a broader passband, effectively by stagger-tuning two cascaded filters. However, this is an expensive solution since the filters have to handle high power signals at ultra high frequencies.

SUMMARY OF THE INVENTION

It is an object of the invention to provide an alternative means of reducing the amplitude modulation due to frequency modulation in television transmitters transmitting two sound carrier signals.

The invention provides a television transmitter as described in the opening paragraph characterized in that the sound signal filter in the combining filter is narrow band and that, to reduce the effect of the amplitude modulation due to frequency modulation produced in the combining filter, the two frequency modulated sound carrier signals are amplitude modulated in the opposite sense to that produced by said filter prior to or within said sound signal amplifier.

The invention allows the use of a simple notch filter in the combining filter by carrying out a pre-correction at lower signal levels in the sound processing circuits. Thus the expense of providing a wide passband for the sound filter in the combining filter is avoided. It is possible to provide this correction in such a manner that an existing transmitter can be modified to transmit two sound carriers without retuning the combining filter, however such retuning has the advantage of reducing the magnitude of the correction required.

DESCRIPTION OF THE DRAWINGS

An embodiment of the invention will now be described, by way of example, with reference to the accompanying drawings, in which.

DESCRIPTION OF THE PREFERRED EMBODIMENT

Figure 1:
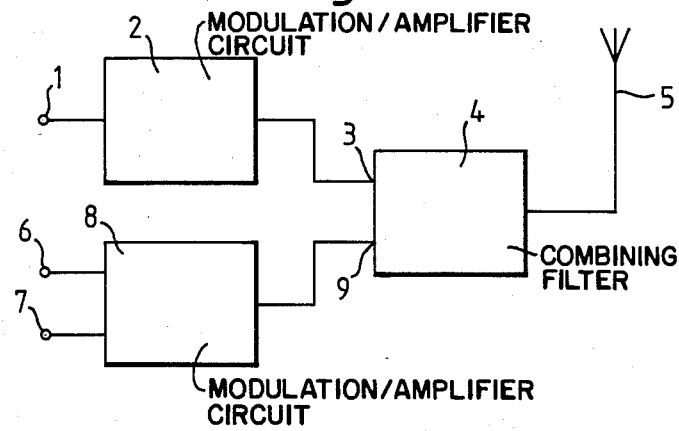
FIG. 1 shows in block schematic form a television transmitter according to the invention.

The television transmitter shown in block schematic form in FIG. 1 has a first input 1 to which, in operation, a vision signal is applied. Input 1 is connected to the input of a vision signal modulation and amplifier circuit 2 whose output is connected to a first input 3 of a combining filter 4. The output of the combining filter 4 is connected to an aerial 5. The television transmitter has two further inputs 6 and 7 to which, in operation, first and second sound signals are applied. The first and second sound signals may be encoded to enable the broadcasting of stereophonic sound or may provide two separate sound channels to enable a program to be accompanied by sound in two different languages selectable by the viewer. The inputs 6 and 7 are connected to first and second inputs of a sound signal modulation and amplifier circuit 8 whose output is connected to a second input 9 of the combining filter 4. In the sound signal modulation and amplifier circuit 8, the two sound signals frequency modulate first and second sound carrier signals which sound carrier signals may typically be spaced by 250 KHz, the actual spacing being dependent on the standards adopted by the Broadcasting Authority.

Figure 2:
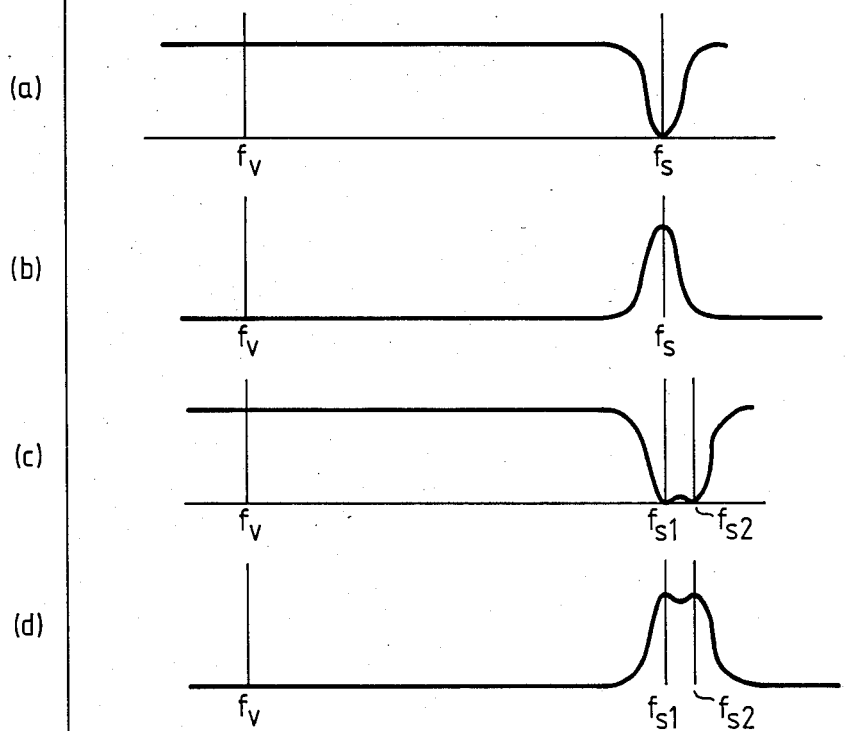
FIG. 2 shows the frequency response of combining filters for television transmitters.

FIG. 2 shows a typical frequency response for the combining filter 4. FIG. 2(a) shows the response of the vision path, i.e. from the input 3 to the output when a single sound carrier is used and FIG. 2(b) shows the corresponding response of the sound path, i.e. from the input 9 to the output. It can be seen that the vision path has a narrow stop band centered on the sound carrier frequency $f_s$ and the sound path has a narrow passsband centered on the frequency $f_s$. FIGS. 2(c) and 2(d) show typical responses of combining circuits used in prior art transmitters for use with two frequency spaced sound carrier signals $f_{s1}$ and $f_{s2}$. This is achieved by stagger-tuning two filter sections. Consequently, the combining filter in these prior art transmitters is complex and expensive. It should be recognized that these filters are handling high power signals at ultra high frequencies. Consequently they are fabricated using waveguide technology and are comparatively bulky and expensive.

Figure 3:
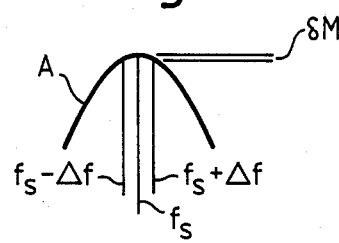
FIGS. 3, 4 and 5 show the frequency responses of filters tuned at or near the sound carrier frequencies and their effect on the amplitude of the frequency modulated sound carrier signals.

It is necessary for the sound filter to have a comparatively flat passband extending over the frequency range of the frequency modulated sound carrier signal to minimize the amplitude modulation of the sound carrier signal introduced as a result of the frequency modulation thereof. FIG. 3 illustrates how this amplitude modulation may arise. Curve A represents the frequency response of the combining filter as shown in FIG. 2(b). The sound carrier frequency $f_s$ is at the center of the passband. $f_s - \Delta f$ and $f_s + \Delta f$ mark the limits of the frequency deviation of the carrier signal when modulated by the sound signal. $\delta M$ shows the change in amplitude of the modulated carrier signal due to its frequency deviation and the frequency response of the filter. When a single sound carrier signal is employed, this amplitude modulation $\delta M$ can be kept at a sufficiently low level by accurately tuning the filter even when the filter comprises only a single section.

Figure 4:
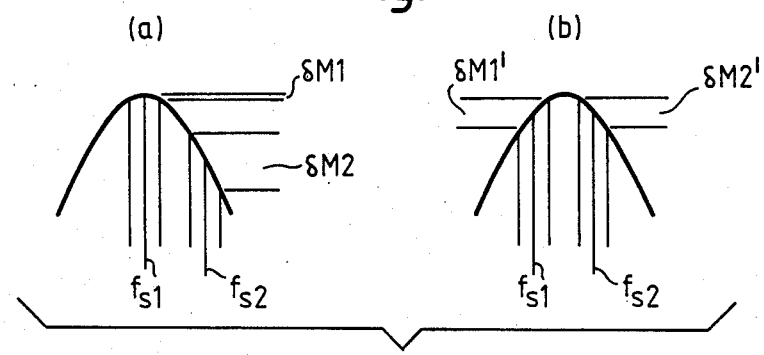

FIG. 4 illustrates the increase amplitude modulation caused by the combining filter if two spaced sound carriers $f_{s1}$ and $f_{s2}$ are employed either without (FIG. 4(a)) or with (FIG. 4(b)) retuning of the combining filter. As can be clearly seen from FIG. 4, the amplitude modulation either of one sound carrier signal δM2 or both carrier signals δM1' and δM2' is increased and in practice this increase is sufficiently great to cause the signals to fall outside the specifications.

Figure 6:
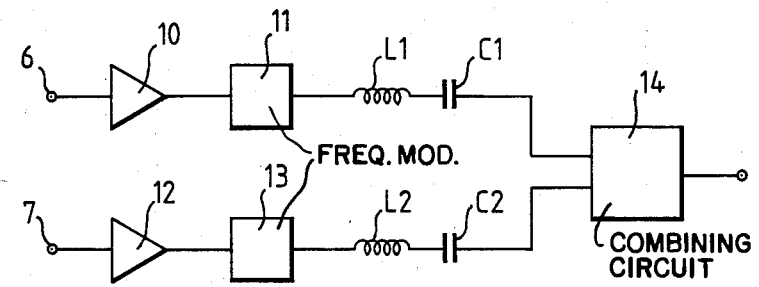
FIG. 6 shows part of the sound amplifier circuit of FIG. 1 in greater detail.

FIG. 6 shows a portion of the sound signal modulation and amplifier circuit 8 in greater detail. As shown in FIG. 6, the input 6 is connected via a buffer amplifier 10 to a first frequency modulator 11 and the input 7 is connected via a buffer amplifier 12 to a second frequency modulator 13. The output of the first frequency modulator 11 is fed via a first tuned circuit, formed by the series arrangement of an inductor L1 and a capacitor C1, to a first input of a combining circuit 14 while the output of the second frequency modulator 13 is fed via a second tuned circuit, formed by the series arrangement of an inductor 12 and a capacitor C2, to a second input of the combining circuit 14.

Figure 5:
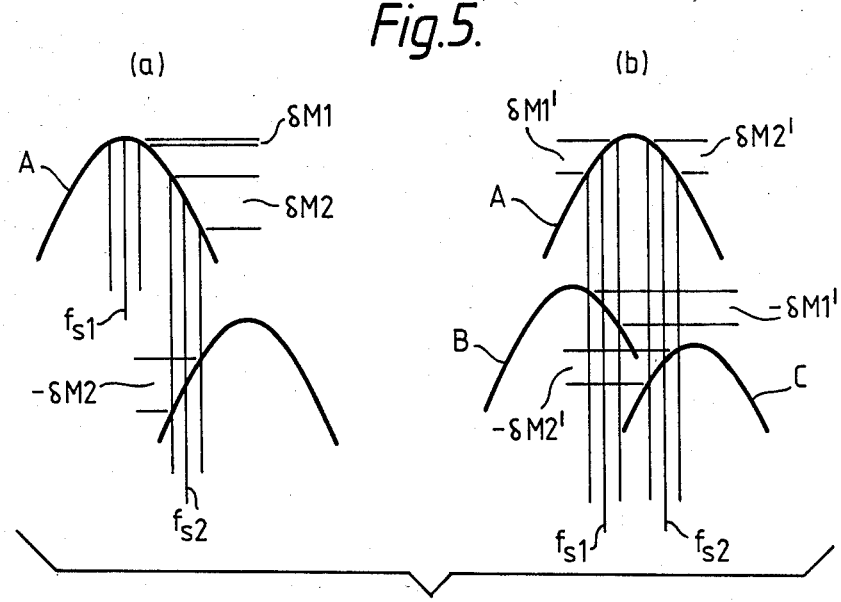

In operation the sound signals are applied to inputs 6 and 7 and fed via the buffer amplifiers 10 and 12 to the frequency modulators 11 and 13. The frequency modulated first and second sound carrier signals are passed through the first and second tuned circuits which are tuned as shown in FIG. 5(b) curves B and C. The resonant frequency and Q of the first and second tuned circuits are chosen so that the amplitude modulation caused by frequency modulation in the first and second tuned circuits −δM1'' and −δM2' is equal and opposite to that produced in the combining filter 4. Thus the total amplitude modulation due to frequency modulation may be reduced to a level which meets the relevant specifications.

While this correction involves the provision of further filters, the filtering is carried out at low signal levels and may also be carried out at the intermediate frequency before frequency translation of the signal to the UHF channel. Consequently the first and second tuned circuits are very much cheaper than the additional UHF high power sections otherwise required in the combining filters.

If the combining filter 4 is not returned, the arrangement shown in FIG. 6 may be modified by omitting one of the tuned circuits and selecting the resonant frequency and Q of the other tuned circuit to compensate for the slope of the combining circuit as shown in FIG. 5(a). While this givesa reduction in the number of components used, a larger pre-correction is required.

The vision signal modulation and amplifier circuit 2 may include a drive system as described in a paper by D. Drury and E. G. Plume entitled "Television Transmitter Drive System Design" presented at the International Broadcasting Convention in September 1976 and published in IEEE Conference Publication No. 145 pages 175 to 178. The contents of this paper are incorporated herein by reference. The modulated vision R.F. output is then fed to a power amplifier such as a klystron whose output is fed to the input 3 of the combining filter 4. The sound signal modulation and amplifier circuit 8 is similar to that disclosed in the aforementioned paper. Modifications required are as follows. Since two audio inputs are required two input attenuators or buffer amplifiers are required and also two modulators each having its own carrier frequency signal. The outputs of the modulators are fed through the correcting filters (tuned circuits in FIG. 6 of this application) to a combining circuit. The output of the combining circuit is then fed to the mixer as shown in the reference. The modulated sound R.F. output is fed to a power amplifier whose output is connected to input 9 of the combining filter 4.

Figure 7:
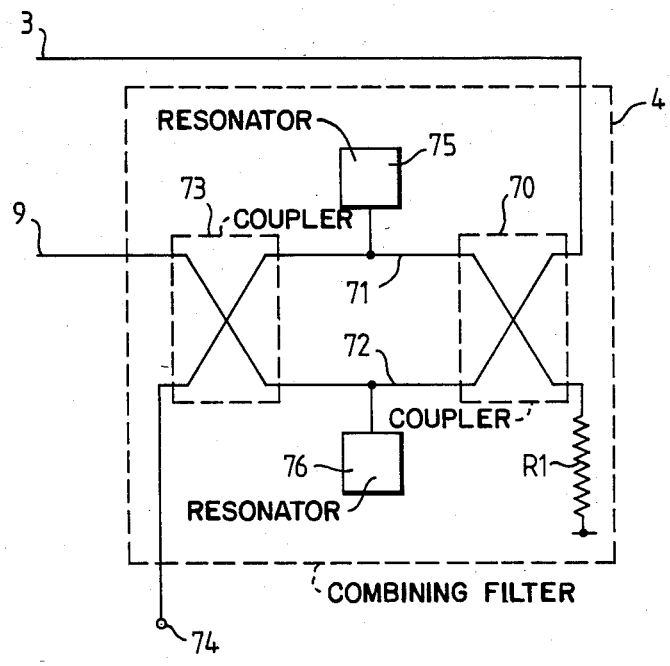
FIG. 7 shows an embodiment of a combining filter suitable for use in the transmitter shown in FIG. 1.

FIG. 7 shows an embodiment of a combining filter suitable for use in a transmitter according to the invention and having a characteristic as shown in FIGS. 2(a) and 2(b). As shown in FIG. 7, the input 3 is connected to an input of a 3 dB coupler 70 where it is split into two paths 71 and 72. These two paths carry the vision signal to a second 3 dB coupler 73 in which they are combined and fed to an output 74 which is connected to the transmitting aerial 5. Two resonators 75 and 76 are connected one in each of the paths 71 and 72. The resonators 75 and 76 are tuned as shown in curve A of FIG. 5(a) or 5(b). This causes any component at the sound R.F. frequency in the signal applied to the input 3 to be reflected back into a load R1. Thus the response of the combining filter from input 3 to output 74 is as shown in FIG. 2(a). The input 9 is connected to an input of the second 3 dB coupler 73 where it is split into the two paths 71 and 72. The two resonators 75 and 76 cause this signal to be reflected back to the 3 dB coupler 73 and it then emerges from output 74 combined with the vision R.F. signal. Thus the response of the combining filter 4 from input 9 to 74 is as shown in FIG. 2(b).

In order to produce the characteristics shown in FIGS. 2(c) and 2(d), the combining filter 4 would have to be modified by providing two resonators in each of the paths 71 and 72, one tuned to each sound carrier frequency. These resonators are bulky and expensive but have, until this invention was devised, been used to produce transmitters capable of transmitting two sound channels with a single vision channel both for stereo sound and dual channel sound e.g. for dual language transmissions.

I claim:

1. A television transmitter comprising a vision signal amplifier, a sound signal amplifier, a sound and vision combining filter, means for generating two frequency modulated sound carrier signals, and means for feeding the frequency modulated sound carrier signals to the sound signal amplifier, characterized in that the sound signal filter in the combining filter is narrow band and that to reduce the effect of the amplitude modulation due to frequency modulation produced in the combining filter, said television transmitter further comprises means for amplitude modulating the two frequency modulated sound carrier signals in the opposite sense to that produced by said combining filter prior to or within said sound signal amplifier.

2. A television transmitter as claimed in claim 1, in which the center of the passband of the combining filter is midway between the frequencies of the two sound carrier signals.

3. A television transmitter comprising a vision signal amplifier, a sound signal amplifier, a sound and vision combining filter, means for generating two frequency modulated sound carrier signals, and means for feeding the frequency modulated sound carrier signals to the sound signal amplifier, characterized in that the sound signal filter in said combining filter is narrow band and is tuned to one of said sound carrier signals, and that to reduce the effect of amplitude modulation, due to frequency modulation, produced in the combining filter, said television transmitter further comprises means for amplitude modulating the other of said sound carrier signals in the opposite sense to that produced by said combining filter, prior to or within said sound signal amplifier.

* * * * *